United States Patent [19]
Haas

[11] 3,859,413
[45] *Jan. 7, 1975

[54] ALUMINA RECOVERY FROM OIL SHALE RESIDUE

[75] Inventor: Frank C. Haas, Arvada, Colo.

[73] Assignee: The Oil Shale Corporation, New York, N.Y.

[ * ] Notice: The portion of the term of this patent subsequent to Mar. 20, 1990, has been disclaimed.

[22] Filed: Aug. 9, 1972

[21] Appl. No.: 279,194

[52] U.S. Cl.................. 423/122, 423/119, 423/629
[51] Int. Cl............................. C01f 7/34, C01f 7/14
[58] Field of Search............ 423/122, 127; 23/301 R

[56] References Cited
UNITED STATES PATENTS

| | | | |
|---|---|---|---|
| 1,618,105 | 2/1927 | Pedersen | 423/127 |
| 2,141,132 | 12/1938 | Folger | 423/127 |
| 3,201,199 | 8/1965 | Lindsay | 423/127 |
| 3,545,923 | 12/1970 | Mercier | 423/127 |
| 3,721,730 | 3/1973 | Haas | 423/119 |

*Primary Examiner*—Oscar R. Vertiz
*Assistant Examiner*—Brian E. Hearn
*Attorney, Agent, or Firm*—Brumbaugh, Graves, Donohue & Raymond

[57] ABSTRACT

An essentially silica-free alumina product is obtained from dawsonite-bearing oil shale by a process which involves rapidly wetting and leaching the retorted residue at about 5°C to about 40°C, with a dilute alkaline leach liquor followed by precipitation of the extracted alumina directly from the leach liquor at about 60°C to about 75°C in the presence of alumina seed.

4 Claims, No Drawings

ALUMINA RECOVERY FROM OIL SHALE RESIDUE

The present invention is directed to a process for recovering high purity, low silica alumina from the retorted residue of dawsonite-bearing oil shale.

Dawsonite is a basic sodium aluminum carbonate mineral having the formula $NaAlCO_3(OH)_2$. Until recently, this source of aluminum has been primarily of academic interest because economically attractive quantities have not been available. However, within the past few years, this mineral has been discovered in great abundance in association with the oil shales and nahcolite of the Piceance Creek Basin in northwestern Colorado. In this association, it is considered a low grade alumina ore which is mined with the oil shale. While the extent of this mineral is not entirely known, data are available to indicate that the aluminum values from this mineral far exceed the bauxite reserves of the United States. At the present time, almost 90% of this country's bauxite is imported. Development of this reserve would provide a substantial domestic source of aluminum for many years into the future.

In my co-pending U.S. Pat. application Ser. No. 102,930, filed Dec. 30, 1970, alumina is recovered from retorted oil shale residue (spent shale) by a process which involves leaching the residue with a soda ash-caustic soda leach liquor to effect the extraction. The alumina is thereafter recovered by precipitation with carbon dioxide. Silica levels in the product are controlled by desilication via seeding prior to the alumina precipitation. The leach operation is conducted for about 1 to 60 minutes at a temperature from about 20° C to about 100° C. While this process is effective in leaching the aluminum values from the retorted residue, it is economically desirable to simplify the process by eliminating the carbon dioxide precipitation and desilication procedures without sacrificing product purity in terms of maintaining low silica levels.

It is, therefore, the object of the present invention to provide an economical process for the recovery of essentially silica-free alumina from dawsonite-bearing oil shale.

In order for raw alumina to be of significant value, it must be of electrolytic cell grade quality. The alumina obtained from the alkaline leaching of dawsonite-bearing oil shale will generally meet all specifications with the exception of silica. The silica specification for electrolytic cell grade alumina is about 0.03 weight percent or less silica measured as $SiO_2$.

It has now been found that essentially all of the dawsonitic alumina can be recovered from the solid residue product of oil shale pyrolysis without solubilizing significant amounts of silica. The process involves leaching the retorted residue (spent shale) in an aqueous slurry with a dilute alkaline leach liquor at a temperature of from about 5° C to about 40° C for about 1 minute or less after the residue has been water wetted to solubilize the aluminum values, heating the alumina-containing liquor to a temperature from about 60° C to about 75° C for about 0.5 to about 4 hours in the presence of alumina seed, i.e., alumina trihydrate, to precipitate the alumina directly from the leach liquor. At pyrolysis temperatures above 350° C, dawsonite is converted to sodium aluminate, alumina and sodium carbonate. The degree of dawsonite conversion to each of these constituents is a function of retorting temperature. As the retorting temperature is increased, the conversion reaction favors increased formation of sodium aluminate and decreased formation of sodium carbonate and alumina.

The alkaline leach liquor may be initially constituted from water or through the addition of caustic soda. If it is desired to reduce chemical costs, caustic soda may be obtained from the residue by conducting the initial leach with water and thereafter precipitating the alumina from the aqueous leach liquor. Upon precipitation of the alumina, caustic soda is formed which is then recycled to the leach circuit. By repeating this operation, the caustic soda content in the akaline leach circuit may be increased to any desired level and, preferably, to between about 5 to about 25 grams per liter. However, if the foregoing water leach procedure is used, several recycle operations will be required to bring the caustic soda concentration to the desired level in the leach circuit. Alternatively, the leach liquor may be initially consitituted by adding from about 5 to about 25 grams per liter caustic soda to the initial aqueous slurry. The caustic soda addition solubilizes the sodium aluminate, alumina and sodium carbonate. In a continuous process, the alkalinity of the leach circuit can be controlled by bleeding off a portion of the liquor recycled from the precipitation circuit. It has been found desirable to maintain the leach alkalinity below about 25 grams per liter caustic soda to obtain optimum alumina and minimum silica dissolution. When the alkalinity of the recycled leach liquor increases above about 25 grams per liter caustic soda, substantial quantities of silica are solubilized which contaminate the product during precipitation of the alumina. Thus, either after several recycle operations or after the initial addition of caustic soda upon start up of the leach and precipitation circuits, the process is chemically self-sufficient.

The sodium carbonate forms a portion of the leach liquor, although the extent to which it contributes to the extraction procedure is unknown; and depending on the composition of the ore, the sodium carbonate level will usually vary from a low of about 5 grams per liter up to about 150 grams per liter. This level may go higher if substantial quantities of a locally associated mineral, namely, nahcolite ($NaHCO_3$), is present, although it is desirable to restrict the sodium carbonate level of the leach liquor to substantially less than about 150 grams per liter to avoid high alkalinity which adversely affects silica solubility.

The leach operation may be initiated once the retorted residue (spent shale) has been wetted or initiated simultaneously with the wetting procedure. Usually, complete retorting of oil shale is accomplished in about 5 minutes at about 500° C and thereafter cooled prior to disposal or further treatment to extract other minerals. The effectiveness of the process utilized to retort the shale determines to a great extent the difficulty of wetting the residue. It is desirable to have virtually no benzene-soluble oil and less than 5 weight percent fixed organic carbon remaining on the residue. Wetting also depends on the equipment chosen to admix the residue and water or leach liquor. For example, in a continuous circuit the wetting and leaching may be carried out simultaneously by separately feeding the leach liquor and pyrolysis residue to a pump suction; allowing the pump to rapidly mix, wet and leach; filtering the leached residue; and discharging the liquor into the precipitation vessel. When the wetting and leaching operations are conducted separately, the residue is considered wetted as soon as a dry, dusty appearance is no longer visible.

Once the spent shale has been wetted, the temperature of the leach circuit and time required to effect the leaching or solubilization of the aluminum values become controlling to the process. The leach operation is conducted at a temperature that is considered cold relative to the subsequent precipitation circuit temperature, and as rapidly as physically feasible. It has been found that increasing the leach temperature to above about 40° C increases the soluble silica in the leach liquor, while decreasing the leach temperature to below about 5° C does not significantly enhance the alumina product, i.e., the alumina to silica weight ratio of the product. It is preferred to carry out the leaching operation at about 25° C since lower temperatures require the addition of costly refrigeration equipment. It has also been found that the aluminum values are leached almost instantaneously and that prolonged leach periods adversely affect product purity by solubilizing silica. The desired leach time is less than 1 minute and usually in the order of a few seconds after the spent shale has been wetted. The unusually pure products produced in accordance with the examples described below were obtained with a commercially available attrition scrubber which simultaneously effects very rapid mixing and leaching.

The solubilized aluminum values are recovered directly from the leach liquor via precipitation in the presence of alumina trihydrate seed. The product precipitates as alumina trihydrate which is thereafter calcined to alumina. Since the leaching operation is conducted at from about 5° C to about 40° C, the aluminum-containing liquor is withdrawn to a separate vessel and heated to between about 60° C and about 75° C. The precipitation is conducted over a period of from about 30 minutes to about 4 hours depending on the weight ratio of alumina trihydrate seeds to alumina in solution (hereinafter called "seed ratio"). The alumina product which precipitates under the foregoing conditions conforms to the silica specification set for the production of electrolytic cell grade alumina, i.e., 0.03 weight percent $SiO_2$ or less.

The optimum alumina precipitation conditions for the purpose of this invention are about 65° C for 1 to 2 hours at a seed ratio of 5:1, although temperatures as low as about 60° C and as high as about 75° C may be used to produce a product having a silica content very close to 0.03 weight percent. Temperatures below and above the foregoing specified range results in products containing more than specified desired silica content, as well as poor alumina precipitation. Overall alumina recovery by this process is in the order of 85 to 100 weight percent of the aluminum values originally contained in the retort residue. The alumina seed utilized herein is preferably alumina trihydrate in a seed ratio of from about 1:1 to about 8:1 or higher. Both fine and coarse grade seed may be used, although precipitation is slower using the coarse seed. It has generally been found that the time required for precipitation of the alumina is inversely proportional to the seed ratio, that is, a seed ratio of 1:1 will require about 3 to 4 hours' precipitation time to produce a satisfactory product, whereas a seed ratio of 8:1 requires only about ½ hour of precipitation time.

The process of the invention will be illustrated further by the following data and examples.

EXAMPLE 1

This example illustrates the effect of varying the leach temperature and time upon the amount of alumina and silica leached from alumina-containing retorted oil shale residue. A high alumina to silica weight ratio is indicative of high alumina and low silica extraction.

A sample of dawsonite-bearing oil shale was retorted at 480° C for about 5 minutes to provide oil vapors and a finely divided residue product containing aluminum values. The residue product was essentially free of benzene-soluble hydrocarbons and contained about 4 weight percent fixed organic carbon.

Portions of the sample were wetted and leached with an aqueous alkaline leach liquor containing caustic soda. The initial caustic soda concentrations were from 10 to 20 grams per liter. The leach liquor was used to first wet the residue product and then to leach the alumina. Both operations were conducted in a commercially available attrition scrubber. Visual inspection of the wetting procedure indicated that the residue was usually completely wetted within about 15 to 30 seconds. Leaching begins as the particles are wetted. Consequently, the length of the leach time is difficult to determine with certainty since some leaching occurs before the sample is entirely wetted. For this reason, it will be noted in the following Table 1 that maximum leach times are presented. In two instances, times of less than about 0.1 minute were recorded on samples obtained immediately after the solids appeared to be completely wetted, i.e., the dusty-like appearance of the solids was rendered wet. The sample portions were leached at 20% to 40% solids concentration at leach temperatures which were varied from 5° C to 60° C. The percent alumina ($Al_2O_3$) extraction and the $Al_2O_3$ and $SiO_2$ content of the pregnant leach liquor were determined as a function of leach temperature and time. The results of 33 such tests are set forth in the following Table 1:

TABLE 1

| Test No. | Leach Temp. °C | Max. Leach Time Min. | % Solids | Leach Liquor g/l NaOH | Pregnant Liquor, g/l $Al_2O_3$ | $SiO_2$ | $Al_2O_3$/$SiO_2$ Ratio | % $Al_2O_3$ Ext'n |
|---|---|---|---|---|---|---|---|---|
| G-51  | 60 | 10  | 40 | 20 | 18.05 | 0.143 | 126 | 95 |
| H-29  | 60 | 10  | 20 | 10 | 8.10  | 0.062 | 131 | 100 |
| G-229 | 60 | 1   | 40 | 20 | 18.04 | 0.090 | 200 | 96 |
| G-228 | 60 | 1   | 40 | 10 | 15.83 | 0.041 | 386 | 88 |
| G-230 | 40 | 1   | 40 | 20 | 19.11 | 0.057 | 335 | 99 |
| G-226 | 25 | 1   | 40 | 20 | 15.85 | 0.030 | 528 | 91 |
| G-221 | 25 | 1   | 40 | 20 | 16.48 | 0.023 | 717 | 99 |
| H-414 | 25 | 1   | 20 | 10 | 8.38  | 0.015 | 516 | 99 |
| H-412 | 5  | 1   | 20 | 20 | 7.13  | 0.012 | 600 | 100 |
| 71-235| 25 | 0.5 | 40 | 20 | 19.08 | 0.030 | 636 | 92 |
| G-248 | 25 | 0.5 | 40 | 15 | 17.76 | 0.019 | 935 | 96 |

TABLE 1 —Continued

| Test No. | Leach Temp. °C | Max. Leach Time Min. | % Solids | Leach Liquor g/l NaOH | Pregnant Liquor, g/l Al₂O₃ | SiO₂ | Al₂O₃/SiO₂ Ratio | % Al₂O₃ Ext'n |
|---|---|---|---|---|---|---|---|---|
| G-249 | 25 | 0.5 | 40 | 10 | 16.96 | 0.016 | 1060 | 83 |
| 71-237 | 25 | 0.25 | 40 | 20 | 19.73 | 0.030 | 658 | 98 |
| 71-238 | 25 | <0.1 | 40 | 20 | 20.21 | 0.039 | 518 | 95 |
| 19* | 25 | <0.1 | 40 | 20 | — | — | 710 | 95–100 |

*Average of 19 Tests

From the above data in Table 1, it is readily apparent that the highest $Al_2O_3/SiO_2$ weight ratios result from conducting the leaching operation at temperatures from 5°C to 25°C for 1 minute or less after the residue has been wetted.

EXAMPLE 2

This example illustrates the effect of raising the precipitation temperature from that used in the leach operation to maintain silica in solution during the precipitation of alumina directly from the pregnant leach liquor.

A sample of retorted shale residue was wetted and leached with an aqueous alkaline liquor containing 20 grams per liter caustic soda at a % solids concentration. The total time required for the wetting and subsequent leaching operations was 1 minute at 25°C. Immediately after conducting the leaching operation, the pregnant liquor was withdrawn from the leach vessel and heated to varying higher temperatures and the alumina allowed to precipitate directly from the heated liquor in the presence of alumina trihydrate seeds. All precipitations were done with a 5:1 seed ratio. The percent of silica in the alumina product (calculated) as a function of the precipitation 2: and time is reported in the following Table 2:

Table 2

| Precip. Temp.,°C | Precip. Time, hrs | Solution Analyses g Al₂O₃/l | g SiO₂/l | % Al₂O₃ Precip. | % SiO₂ Precip. | % SiO₂ in Prod. (calc.) |
|---|---|---|---|---|---|---|
| 30 | 0 | 19.26 | 0.027 | | | |
|  | 0.5 | 19.26 | 0.027 | 0 | 0 | 0 |
|  | 1 | 17.56 | 0.025 | 8.8 | 7.4 | 0.12 |
|  | 2 | 14.40 | 0.026 | 25.2 | 3.7 | 0.021 |
|  | 3 | 12.90 | 0.024 | 33.0 | 11.1 | 0.047 |
| 40 | 0 | 19.14 | 0.027 | | | |
|  | 0.5 | 17.84 | 0.027 | 13.0 | 0 | 0 |
|  | 1 | 15.38 | 0.025 | 19.6 | 7.4 | 0.053 |
|  | 2 | 12.35 | 0.025 | 35.5 | 7.4 | 0.029 |
|  | 3 | 10.51 | 0.024 | 45.1 | 11.1 | 0.035 |
| 50 | 0 | 19.27 | 0.030 | | | |
|  | 0.5 | 15.61 | 0.027 | 19.0 | 10 | 0.082 |
|  | 1 | 11.41 | 0.027 | 40.8 | 10 | 0.038 |
|  | 2 | 9.32 | 0.026 | 51.6 | 13.3 | 0.040 |
|  | 3 | 8.87 | 0.026 | 54.0 | 13.3 | 0.038 |
| 60 | 0 | 18.90 | 0.027 | | | |
|  | 0.5 | 12.37 | 0.026 | 34.6 | 3.7 | 0.015 |
|  | 1 | 10.55 | 0.025 | 44.2 | 7.4 | 0.024 |
|  | 2 | 9.08 | 0.025 | 52.0 | 7.4 | 0.020 |
|  | 3 | 8.13 | 0.024 | 57.0 | 11.1 | 0.028 |
| 65 | 0 | 19.01 | 0.027 | | | |
|  | 0.5 | 11.73 | 0.025 | 38.3 | 7.4 | 0.027 |
|  | 1 | 10.00 | 0.025 | 47.4 | 7.4 | 0.022 |
|  | 2 | 8.53 | 0.025 | 55.1 | 7.4 | 0.019 |
|  | 3 | 7.82 | 0.025 | 58.9 | 7.4 | 0.018 |
| 70 | 0 | 19.50 | 0.027 | | | |
|  | 0.5 | 11.65 | 0.024 | 40.3 | 11.1 | 0.038 |
|  | 1 | 9.88 | 0.024 | 49.3 | 11.1 | 0.031 |
|  | 2 | 8.74 | 0.025 | 55.2 | 7.4 | 0.019 |
|  | 3 | 8.33 | 0.024 | 57.3 | 11.1 | 0.027 |
| 75 | 0 | 18.69 | 0.028 | | | |
|  | 0.5 | 15.24 | 0.025 | 18.5 | 10.7 | 0.087 |
|  | 1 | 10.14 | 0.025 | 45.8 | 10.7 | 0.035 |
|  | 2 | 8.90 | 0.025 | 52.4 | 10.7 | 0.031 |
|  | 3 | 8.68 | 0.025 | 53.6 | 10.7 | 0.030 |
| 80 | 0 | 19.27 | 0.030 | | | |
|  | 0.5 | 11.62 | 0.026 | 39.7 | 13.3 | 0.052 |
|  | 1 | 10.32 | 0.027 | 46.4 | 10.0 | 0.034 |
|  | 2 | 9.79 | 0.026 | 49.2 | 13.3 | 0.042 |
|  | 3 | 9.68 | 0.028 | 49.8 | 6.7 | 0.021 |
| 90 | 0 | 18.20 | 0.027 | | | |
|  | 0.5 | 12.41 | 0.023 | 31.8 | 14.8 | 0.069 |
|  | 1 | 12.06 | 0.023 | 33.7 | 14.8 | 0.064 |
|  | 2 | 11.91 | 0.023 | 34.6 | 14.8 | 0.064 |
|  | 3 | 11.76 | 0.023 | 35.4 | 14.8 | 0.062 |

From the data in the above Table 2, it is readily apparent that the optimum conditions for alumina precipitation and meeting the silica specifications of about 0.03 weight percent are 65° C for 1 to 2 hours. The data also show that the temperature could go as low as 60° C and as high as 75° C and still produce a satisfactory product, but the silica content would be very close to specification. Below and above this temperature range, silica is above specification and the precentage of alumina precipitated is lower.

EXAMPLE 3

This example illustrates the effect of precipitation time and temperature on alumina recovery and silica contamination of the alumina product using a semi-continuous (batch) leach circuit in which recycled barren precipitation liqour is cooled and utilized as the leach liquor. Leach temperatures of 25° C and 40° C, respectively, were tested.

Two tests were conducted in which retorted alumina-containing oil shale residue was leached with recycled liquor at 25° C and 40° C, respectively, at 40% solids concentration for 1 minute and 20 grams per liter of caustic soda (initial concentration). No additional caustic soda was added to the recycle liquor. The pregnant leach liquor was withdrawn to a separate vessel, heated to 70° C to 80° C and then seeded with alumina trihydrate in a seed ratio of 5:1 to precipitate alumina directly from the leach liquor. The barren precipitation liquor was then recycled to additional residue for extracting additional aluminum values. Table 3 presents the results of seven cycles, conducted at a leach temperature of 25° C, whereas Table 4 presents similar data at 40° C.

Table 3

| Cycle and Liquor Type | Precip. Time, hrs | Direct Precipitation at 70°C to 80°C Recycle Leach Liquor Cooled to 25°C | | % $Al_2O_3$ Extr'n | % $Al_2O_3$ Precip. | % $SiO_2$ in Prod. (Calc.) |
|---|---|---|---|---|---|---|
| | | Solution Analyses g $Al_2O_3$/l | g $SiO_2$/l | | | |
| First Cycle | | | | | | |
| Pregnant | | 20.76 | 0.045 | 99 | | |
| Barren | 4.0 | 8.95 | 0.044 | | 57 | |
| Barren | 19.5 | 7.95 | 0.044 | | 62 | 0.008 |
| Second Cycle | | | | | | |
| Pregnant | | 24.75 | 0.041 | 93 | | |
| Barren | 4.0 | 9.79 | 0.039 | | 60 | 0.013 |
| Third Cycle | | | | | | |
| Pregnant | | 26.98 | 0.043 | 98 | | |
| Barren | 0.5 | 11.67 | 0.041 | | 57 | 0.013 |
| Barren | 1.0 | 11.67 | 0.041 | | 57 | |
| Barren | 2.0 | 11.51 | 0.041 | | 57 | |
| Barren | 3.0 | 11.11 | 0.039 | | 59 | 0.025 |
| Fourth Cycle | | | | | | |
| Pregnant | | 26.05 | 0.043 | 95 | | |
| Barren | 0.5 | 10.33 | 0.038 | | 60 | 0.032 |
| Barren | 1.0 | 9.37 | 0.038 | | 64 | |
| Fifth Cycle | | | | | | |
| Pregnant | | 23.70 | 0.034 | 86 | | |
| Barren | 0.5 | 10.08 | 0.029 | | 54 | 0.037 |
| Sixth Cycle | | | | | | |
| Pregnant | | 25.91 | 0.030 | 102 | | |
| Barren | 0.6 | 9.58 | 0.026 | | 63 | 0.024 |
| Seventh Cycle | | | | | | |
| Pregnant | | 23.27 | 0.032 | 92 | | |
| Barren | 0.5 | 9.59 | 0.028 | | 59 | 0.029 |

Table 4

| Cycle and Liquor Type | Precip. Time, hrs | Direct Precipitation at 70°C to 80°C Recycle Leach Liquor Cooled to 40°C | | % $Al_2O_3$ Extr'n | % $Al_2O_3$ Precip. | % $SiO_2$ in Prod. (Calc.) |
|---|---|---|---|---|---|---|
| | | Solution Analyses g $Al_2O_3$/l | g $SiO_2$/l | | | |
| First Cycle | | | | | | |
| Pregnant | | 22.03 | 0.074 | 99 | | |
| Barren | 0.5 | 10.89 | 0.061 | | 51 | 0.12 |
| Second Cycle | | | | | | |
| Pregnant | | 29.19 | 0.063 | 91 | | |
| Barren | 0.5 | 12.88 | 0.058 | | 56 | 0.031 |
| Barren | 1.0 | 12.38 | 0.058 | | 58 | 0.030 |
| Third Cycle | | | | | | |
| Pregnant | | 30.27 | 0.117 | 91 | | |
| Barren | 0.5 | 13.64 | 0.075 | | 55 | 0.25 |

Table 4 —Continued

| Cycle and Liquor Type | Precip. Time, hrs | Direct Precipitation at 70°C to 80°C Recycle Leach Liquor Cooled to 40°C | | % Al$_2$O$_3$ Extr'n | % Al$_2$O$_3$ Precip. | % SiO$_2$ in Prod. (Calc.) |
|---|---|---|---|---|---|---|
| | | Solution Analyses | | | | |
| | | g Al$_2$O$_3$/l | g SiO$_2$/l | | | |
| Fourth Cycle | | | | | | |
| Pregnant | | 35.40 | 0.100 | 99 | | |
| Barren | 1.0 | 17.10 | 0.093 | | 51 | 0.038 |
| Barren | 2.0 | 16.70 | 0.095 | | 53 | 0.027 |
| Barren | 3.0 | 15.00 | 0.097 | | 58 | 0.015 |
| Barren | 4.0 | 13.91 | 0.093 | | 61 | 0.033 |
| Fifth Cycle | | | | | | |
| Pregnant | | 32.44 | 0.112 | 96 | | |
| Barren | 1.0 | 16.53 | 0.103 | | 49 | 0.057 |
| Barren | 2.0 | 15.00 | 0.103 | | 54 | 0.052 |
| Barren | 3.0 | 15.00 | 0.098 | | 54 | 0.080 |
| Barren | 4.0 | 14.02 | 0.106 | | 57 | 0.033 |
| Sixth Cycle | | | | | | |
| Pregnant | | 21.73 | 0.061 | 97 | | |
| Barren | 0.5 | 11.56 | 0.045 | | 47 | 0.16 |
| Barren | 1.0 | 10.90 | 0.045 | | 50 | 0.15 |
| Barren | 2.0 | 10.87 | 0.046 | | 50 | 0.14 |
| Barren | 3.0 | 10.10 | 0.046 | | 54 | 0.13 |
| Barren | 4.0 | 9.45 | 0.050 | | 57 | 0.09 |
| Seventh Cycle | | | | | | |
| Pregnant | | 29.95 | 0.058 | 94 | | |
| Barren | 2.0 | 13.24 | 0.050 | | 56 | 0.048 |
| Barren | 3.0 | 12.96 | 0.050 | | 57 | 0.047 |
| Barren | 4.5 | 11.15 | 0.050 | | 63 | 0.043 |

From the data above in Tables 3 and 4, it is apparent that the barren liquor from the precipitation step may be recycled at least seven times without adding additional caustic soda to the leach liquor while continuing to maintain high alumina extraction efficiencies. In both instances, the alumina extraction efficiency after seven cycles averaged at least 95%. However, a comparison of Tables 3 and 4 shows that at a leach temperature of 40° C, (Table 4), the silica content of the product became quite erratic and did not always meet the desired maximum level of 0.03 weight percent, whereas excellent results were obtained when the recycle liquor was cooled to 25° C (Table 3) prior to each leach operation. It is also shown that extending the precipitation time beyond 30 minutes, i.e., for 1 to 4 hours, does not significantly increase the amount of alumina precipitated.

EXAMPLE 4

This example illustrates the adaptability of the process to dawsonitic oil shales which also contain about 4 weight percent nahcolite (NaHCO$_3$). In order to successfully extract alumina from this type of ore, a bleed stream from the barren precipitation liquor was taken on each cycle to maintain a low level of alkalinity in the leach liquor, i.e., about 20 grams per liter caustic soda.

A batch leaching test was performed on the retorted residue of dawsonite-bearing oil shale which also contained 4 weight percent nahcolite. The leaching operation was conducted at 25° C and 40% solids concentration for one minute with a leach liquor initially containing 20 grams per liter caustic soda. Precipitation was conducted in a separate vessel for ½ hour with a seed ratio of 5:1. Precipitation temperature during the first five cycles was maintained at 80° C and thereafter at 60° C. A 10% bleed stream was taken from the recycle liquor. The percent alumina extraction and precipitation, and silica in the product through 14 cycles is presented in the following Table 5:

Table 5

| Cycle and Liquor Type | Direct Precipitation - Recycle Leach (25°C) of Residue Containing 4% NaHCO$_3$ with a 10% Bleed | | % Al$_2$O$_3$ Extr'n | % Al$_2$O$_3$ Precip. | % SiO$_2$ in Prod. (Calc.) |
|---|---|---|---|---|---|
| | Solution Analyses | | | | |
| | g Al$_2$O$_3$/l | g SiO$_2$/l | | | |
| First Cycle | | | | | |
| Pregnant | 21.35 | 0.069 | 97 | | |
| Barren | 16.58 | 0.066 | | 22 | 0.063 |
| Second Cycle | | | | | |
| Pregnant | 32.37 | 0.066 | 94 | | |
| Barren | 14.68 | 0.057 | | 55 | 0.051 |
| Third Cycle | | | | | |
| Pregnant | 33.53 | 0.066 | 95 | | |
| Barren | 14.16 | 0.066 | | 58 | 0 |
| Fourth Cycle | | | | | |
| Pregnant | 34.23 | 0.071 | 100 | | |
| Barren | 15.27 | 0.064 | | 55 | 0.036 |

Table 5 —Continued

| Cycle and Liquor Type | Direct Precipitation - Recycle Leach (25°C) of Residue Containing 4% NaHCO$_3$ with a 10% Bleed | | % Al$_2$O$_3$ Extr'n | % Al$_2$O$_3$ Precip. | % SiO$_2$ in Prod. (Calc.) |
|---|---|---|---|---|---|
| | Solution Analyses | | | | |
| | g Al$_2$O$_3$/l | g SiO$_2$/l | | | |
| Fifth Cycle | | | | | |
| Pregnant | 33.18 | 0.082 | 89 | | |
| Barren | 16.03 | 0.069 | | 52 | 0.076 |
| Sixth Cycle | | | | | |
| Pregnant | 27.22 | 0.065 | 80 | | |
| Barren | 12.69 | 0.060 | | 53 | 0.034 |
| Seventh Cycle | | | | | |
| Pregnant | 28.13 | 0.064 | 84 | | |
| Barren | 13.35 | 0.064 | | 53 | 0 |
| Eighth Cycle | | | | | |
| Pregnant | 31.15 | 0.058 | 94 | | |
| Barren | 14.12 | 0.055 | | 55 | 0.018 |
| Ninth Cycle | | | | | |
| Pregnant | 31.25 | 0.061 | 88 | | |
| Barren | 13.86 | 0.061 | | 56 | 0 |
| Tenth Cycle | | | | | |
| Pregnant | 31.35 | 0.064 | 91 | | |
| Barren | 14.44 | 0.062 | | 54 | 0.012 |
| Eleventh Cycle | | | | | |
| Pregnant | 30.90 | 0.065 | 91 | | |
| Barren | 13.07 | 0.062 | | 58 | 0.017 |
| Twelfth Cycle | | | | | |
| Pregnant | 30.78 | 0.060 | 97 | | |
| Barren | 13.69 | 0.056 | | 56 | 0.024 |
| Thirteenth Cycle | | | | | |
| Pregnant | 28.79 | 0.060 | 95 | | |
| Barren | 11.86 | 0.060 | | 59 | 0 |
| Fourteenth Cycle | | | | | |
| Pregnant | 28.64 | 0.056 | 91 | | |
| Barren | 13.66 | 0.053 | | 52 | 0.020 |

From the above data in Table 5, it can be seen that a satisfactory alumina product was obtained after the precipitation temperature was lowered from 80° C to 60° C (Fifth Cycle). The alumina content from the nine cycles at 60° C had an average silica content of 0.014 weight percent, whereas at 80° C the silica content averaged 0.045 weight percent.

EXAMPLE 5

This example illustrates the effect of varying the seed ratio on the alumina precipitation time and the silica content of the product.

One test was conducted in which retorted alumina-containing oil shale residue was leached for 1 minute at 25° C with 20 grams per liter of caustic soda (initial concentration) at 40% solids concentration. Four samples of the pregnant leach liquor were withdrawn to separate precipitation vessels and heated to and maintained at 65° C in the presence of alumina trihydrate seed. Seed ratios of 1:1, 3:1, 5:1, and 8:1 were tested. Reagent grade fine alumina trihydrate seed was used in each test. The results for precipitation times up to 3 hours are presented in the following Table 6:

Table 6

| | | Aluminum and Silica Precipitation versus Seed Ratio and Time | | | | |
|---|---|---|---|---|---|---|
| Seed Ratio | Precip. Time, hrs | Solution Analyses | | % Al$_2$O$_3$ Precip. | % SiO$_2$ Precip. | % SiO$_2$ in Prod. (Calc.) |
| | | g Al$_2$O$_3$/l | g SiO$_2$/l | | | |
| 1:1 | 0 | 18.26 | 0.030 | | | |
| | 0.5 | 18.26 | 0.030 | 0 | 0 | 0 |
| | 1 | 17.79 | 0.029 | 2.6 | 3.3 | 0.21 |
| | 2 | 12.49 | 0.027 | 31.6 | 10.0 | 0.052 |
| | 3 | 10.70 | 0.029 | 41.4 | 3.3 | 0.013 |
| 3:1 | 0 | 18.26 | 0.030 | | | |
| | 0.5 | 12.90 | 0.029 | 29.4 | 3.3 | 0.019 |
| | 1 | 10.55 | 0.028 | 42.2 | 6.7 | 0.026 |
| | 2 | 9.02 | 0.029 | 50.6 | 3.3 | 0.011 |
| | 3 | 8.44 | 0.029 | 53.8 | 3.3 | 0.010 |
| 5:1 | 0 | 19.01 | 0.027 | | | |
| | 0.5 | 11.73 | 0.025 | 38.3 | 7.4 | 0.027 |
| | 1 | 10.00 | 0.025 | 47.4 | 7.4 | 0.022 |
| | 2 | 8.53 | 0.025 | 55.1 | 7.4 | 0.019 |
| | 3 | 7.82 | 0.025 | 58.9 | 7.4 | 0.018 |
| 8:1 | 0 | 18.19 | 0.030 | | | |
| | 0.5 | 9.02 | 0.030 | 50.4 | 0 | 0 |
| | 1 | 8.37 | 0.029 | 54.0 | 3.3 | 0.010 |
| | 2 | 7.46 | 0.028 | 59.0 | 6.7 | 0.019 |
| | 3 | 7.19 | 0.030 | 61.4 | 0 | 0 |

From the above data in Table b, it is apparent that a virtually silica-free, high yield alumina product is obtained with a high 8:1 seed ratio and a precipitation of 30 minutes. Satsifactory product yields and purities are obtainable at seed ratios as low as 3:1 for two to three hours precipitation time.

Various modifications and changes in the process of the invention in addition to those pointed out above can be readily made by those skilled in the art without departing from the essence of the invention and accordingly the invention is to be limited only within the scope of the appended claims.

What is claimed is:

1. A process for recovering high purity, low silica alumina from the pyrolysis residue of dawsonitebearing oil shale which comprises:
   a. wetting and leaching the pyrolysis residue with a dilute alkaline leach liquor containing from about 5 to about 25 grams per liter of caustic soda at a leaching temperature of from about 5° C. to about 40° C. for a short leaching time period of about 1 minute or less to solubilize the aluminum values of the pyrolysis residue in the leach liquor; and
   b. heating the leach liquor containing the solubilized aluminum values to a temperature of from about 60° C. to about 75° C. in the presence of alumina trihydrate seed to precipitate alumina trihydrate directly from the leach liquor.

2. The process as defined in claim 1 wherein the temperature of the leach liquor is maintained at about 25° C.

3. The process as defined in claim 1 wherein the precipitation step (b) is carried out over a period of from about 30 minutes to about 4 hours.

4. The process as defined in claim 1 wherein the ratio of alumina trihydrate seed to alumina in solution varies from about 1:1 to about 8:1.

* * * * *

PO-1050
(5/69)

UNITED STATES PATENT OFFICE
CERTIFICATE OF CORRECTION

Patent No. 3,859,413      Dated January 7, 1975

Inventor(s)    Frank C. Haas

It is certified that error appears in the above-identified patent and that said Letters Patent are hereby corrected as shown below:

Col. 6, line 13, "% solids" should read -- 40% solids --; line 23, "precipitation 2:" should read -- precipitation temperature --. Col. 8, line 6, "and 20 grams" should read -- with 20 grams --. Col. 13, line 1, "Table b" should read -- Table 6 --.

Signed and sealed this 1st day of April 1975.

(SEAL)
Attest:

RUTH C. MASON
Attesting Officer

C. MARSHALL DANN
Commissioner of Patents
and Trademarks